(12) United States Patent
Mangin et al.

(10) Patent No.: US 6,760,336 B1
(45) Date of Patent: Jul. 6, 2004

(54) FLOW DETECTION SCHEME TO SUPPORT QOS FLOWS BETWEEN SOURCE AND DESTINATION NODES

(75) Inventors: James Mangin, San Ramon, CA (US); Mohan Kalkunte, Sunnyvale, CA (US); Derek Pitcher, Los Altos, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/252,430

(22) Filed: Feb. 18, 1999

(51) Int. Cl.⁷ .................. G06F 15/16; H04L 12/28; H04L 12/50
(52) U.S. Cl. .................. 370/395.21; 370/395.52; 709/228; 709/238
(58) Field of Search .................. 709/238, 242, 709/243, 244, 227, 228, 229, 239; 370/389, 392, 351, 352, 357, 395.52, 355, 360, 395.21

(56) References Cited

U.S. PATENT DOCUMENTS

| | | | | |
|---|---|---|---|---|
| 5,430,720 A | * | 7/1995 | Larsson et al. | 370/60 |
| 5,757,771 A | * | 5/1998 | Li et al. | 370/235 |
| 5,832,197 A | * | 11/1998 | Houji | 395/182.02 |
| 5,850,399 A | * | 12/1998 | Ganmukhi et al. | 370/412 |
| 5,930,259 A | * | 7/1999 | Katsube et al. | 370/409 |
| 5,933,429 A | * | 8/1999 | Bubenik et al. | 370/392 |
| 5,996,021 A | * | 11/1999 | Civanlar et al. | 709/238 |
| 6,009,097 A | * | 12/1999 | Han | 370/395 |
| 6,151,324 A | * | 11/2000 | Belser et al. | 370/397 |
| 6,169,748 B1 | * | 1/2001 | Barbas et al. | 370/468 |

OTHER PUBLICATIONS

Katsube et al., "Toshiba's Router Architecture Extensions for ATM : Overview," memorandum, Feb. 1977, Network Working Group, Request for Comments: 2098, Toshiba R&D Center.

\* cited by examiner

*Primary Examiner*—Dung C. Dinh
(74) *Attorney, Agent, or Firm*—Blakely Sokoloff Taylor & Zafman LLP

(57) ABSTRACT

A method and a system for improving communication performance between nodes in a network is disclosed. In one embodiment, the system includes routers, switches, and a communication interface. The communication interface detects a communication flow between a source and a destination in response to a flow criteria. Upon detecting the communication flow, the communication interface issues a resolution request for identifying data path. After receipt of a response to the resolution request, multiple connections between switches are established in response to levels of quality of service (QoS).

32 Claims, 7 Drawing Sheets

FLOW DETECTION SCHEME TO SUPPORT QOS FLOWS BETWEEN SOURCE AND DESTINATION NODES

BACKGROUND OF THE INVENTION

1. Field of the Invention

The present invention relates to the field of communication systems. More specifically, the present invention relates to communication networks involving quality of service ("QoS").

2. Description of the Related Art

A network communication is a collection of computers and other system devices such as printers and servers that are linked together over distances for sharing of resources. A Local Area Network ("LAN") is a typical network communication system, which allows a number of independent source and destination devices to communicate with each other within a moderately sized geographical area. A wide area network ("WAN") is another network communication system that serves individual users over a large geographical area.

FIG. 1 illustrates a conventional network system 100, which could be either LAN or WAN. The system 100 contains workstations, hubs, bridges, switches and routers. A workstation is typically considered as one node in a network and is normally a processing based computing system, such as a personal computer ("PC"), a mini-computer or a mainframe. Switches, (multiport bridges) are typically used as network bridging devices between the workstations and network routers for enhancing network performance. For example, switch X 110 is connected to workstation B 130, C 132 and D 134 where the switch X 110 is used as a bridging device between the workstation B130, C132 and D134 and network routers 120.

In general, switches do not perform the functions of scale and partition. Partition refers to dividing the workload between clients and servers. Scalability refers to the ability of network growth as the demand increases. On the other hand, routers is usually capable of performing the functions of scale and partition.

Using network switches as bridging devices generally provide greater network performance. Each switch typically stores addresses of workstations connected to the switch so that it can identify and access the connected workstations rapidly. For example, switch Y 114 stores the addresses of workstation E 136, F 138, and G 139 so that switch Y 114 can deliver and pickup data to and from the workstations E 136, F 138, and G 139. Moreover, a switch is further configured to be connected to a set of network routers. For example, the switch X 110 is connected to router P 122 and switch Y 114 is connected to router R 126.

A typical network router, such as router P 122, provides logical connections between workstations or switches using common network protocols. Routers are typically operated under asynchronous transfer mechanism ("ATM") or other technologies. Each router usually knows the address of the destination node or knows how to find the destination node. It should be noted that workstations may also be connected to a router directly, such as workstation A 102.

In operation, upon a request of data transaction in a network, a path of data flow between a source and destination nodes is established. For example, if the workstation B 130 sends a message to the workstation E 136, the workstation B 130 requests switch X 110 to find the destination node, which is workstation E 136. If switch X 110 does not contain the requested information, switch X 100 subsequently passes the request to router P 122 for locating the destination node. After several hops between the routers, router R 126 identifies switch Y 114, which contains the destination node. After locating of the destination node, switch Y 114 delivers the message to workstation E 136.

FIG. 2 illustrates a conventional networking software 200 where the networking software 200 typically reflects a stacking system. The networking software 200 is an Open System Interconnection (OSI) system, which commonly divides network communication activities into seven layers. Layer one of the OSI is a physical level, which is a hardware layer involving transmitting data across the physical transmission medium.

Layer two of the OSI is a data link level 272, which is a switching level involving data packaging for network transmission. The data link level 272 further identifies source and destination addresses. Layer three is a network level 274 where data packets are addressed and delivered between nodes. The network level 274 further manages routing information for the routers.

Layer four is a transport level 276 where data is sent and received between the nodes. The transport level 276 further issues transporting error message for lost data. Layer five is a session level 278, which essentially establishes, maintains, and concludes a network communication between the nodes.

Layer six is a presentation level 280 where data translation between different systems is provided. In other words, the presentation level 280 translates data to and from a system's native data format. Layer seven is an application level 282, which is used to interface with application programs. It should be noted that not every networking software is configured into seven layers.

Moreover, switches (or multiport bridges) are commonly employed at the data link level 272, which performs bridging functions for transferring data. Likewise, routers are typically used at the network level 274 where routing functions are performed between the routers. In general, the rate of data transfer for a typical switch is many times faster than a typical router.

Thus, increase in activities in layer two will likely increase the network's overall performance.

FIG. 3 illustrates a conventional network communication system 300. The system 300 contains switch A 204, B 206, router A 214, B 216 and virtual circuits (VCs). VCs are typically established by common ATM signaling system or by same network management entity. Upon initiation of a network communication, a VC is commonly set up between a message's origin and destination.

Switch A 204 contains workstation A 222, B 224, C 226, and D 228 while switch B 206 contains workstation W 232, X 234, Y 236, and Z 238. It should be noted that there could be more routers situated between router A 214 and router B 216.

Upon requesting a data transfer between workstation A 222 and workstation W 232, a path of data flow between workstation A 222 and workstation W 232 is established. FIG. 3 shows a typical path of data flow where the path starts at switch A 204 and ends at switch B 206, having passed through router A 214 and router B 216. VC 240 is used to transport the data between switch A 204 and router A 214, while VC 242 is used to transport the data between router A 214 and router B 216. VCs are commonly point to point intelligent links. Different levels of VC services are employed at different connections, such as a switch to switch connection or a router to router connection. It should be noted that a router can typically transfer between 100,000 to 300,000 packets per second (pp.), whereas a typical switch can transfer between 1,000,000 to 1,500,000 pps. Accordingly, increasing in switch to switch transfer enhances the network overall performance.

Multi-Protocol over ATM (MPOA) is one approach to enhance the network performance relating to network switch. MPOA, which commonly operates under the ATM forum specification, is configured to set up a connection or a shortcut VC between switches bypassing routers after a destination node is found. In order to set up a connection between switches, MPOA typically initiates a process that involves detecting a communication flow, issuing an address resolution request, and setting up a connection.

However, a problem with this approach is that for establishing each new shortcut VC between the same source and destination pair for a different QoS level, the same process must be followed. Repeating the same process for different QoS level is expensive in terms of time and resources. Accordingly, it is desirable to have a mechanism that establishes multiple connections or VC shortcuts for all levels of QoS as soon as a destination node is determined. As will be seen, one embodiment of the present invention provides a mechanism that establishes multiple switch to switch connections upon identifying the destination node where each individual connection is used for each level of QoS.

SUMMARY OF THE INVENTION

A method and a system for improving communication performance between nodes in a network is disclosed. In one embodiment, the system includes routers, switches, and a switch connecting scheme (SCS). The SCS detects a communication flow between a source and destination nodes in response to a flow criteria. A communication flow includes at least a source and a destination address where the address is an Internet Protocol (IP) address. A flow criteria could be any set of predefined triggering conditions.

Upon detecting the communication flow, the SCS issues a resolution request for identifying a data path. After receipt of a response to the resolution request, multiple switch to switch connections are established in response to all levels of quality of service (QoS). In another embodiment, after establishing the multiple switch to switch connections, all workstations associated with the connected switches can use the connections. In yet another embodiment, upon discovery of unnecessary switch to switch connections, the SCS eliminates the unnecessary connections according to a torn-down criteria.

BRIEF DESCRIPTION OF THE DRAWINGS

The present invention is illustrated by way of example and not by way of limitation in the accompanying figures.

DETAILED DESCRIPTION

A method and a system for improving communication performance in a network by setting up multiple switch to switch connections for all levels of QoS is disclosed. In the following description of an embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

A Switch Connecting Scheme ("SCS") provides an improvement for network communications by establishing connections or virtual circuit (VC) shortcuts between network switches. A switch performs a bridging function between workstations and network routers where the switch essentially transports information between workstations and network routers. Switches offer faster transferring rate than routers because switches combine the techniques of packet and cell switching. In one embodiment, upon detection of a communication flow between a source and destination nodes, the SCS issues a resolution request. After receipt of the response to the resolution request, the SCS sets up multiple switch to switch connections in response to all levels of QoS where each connection is designated to a level of QoS.

Figure 1:
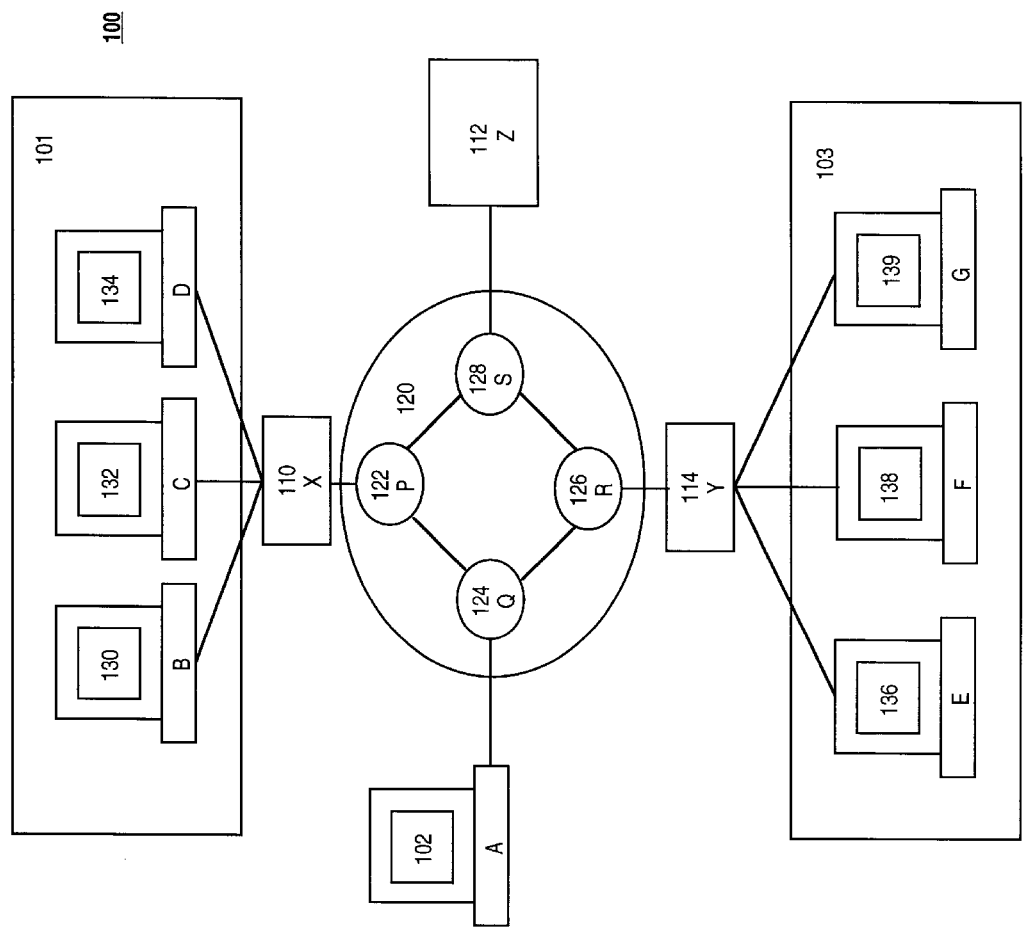
FIG. 1 illustrates a conventional network configuration.
Figure 2:
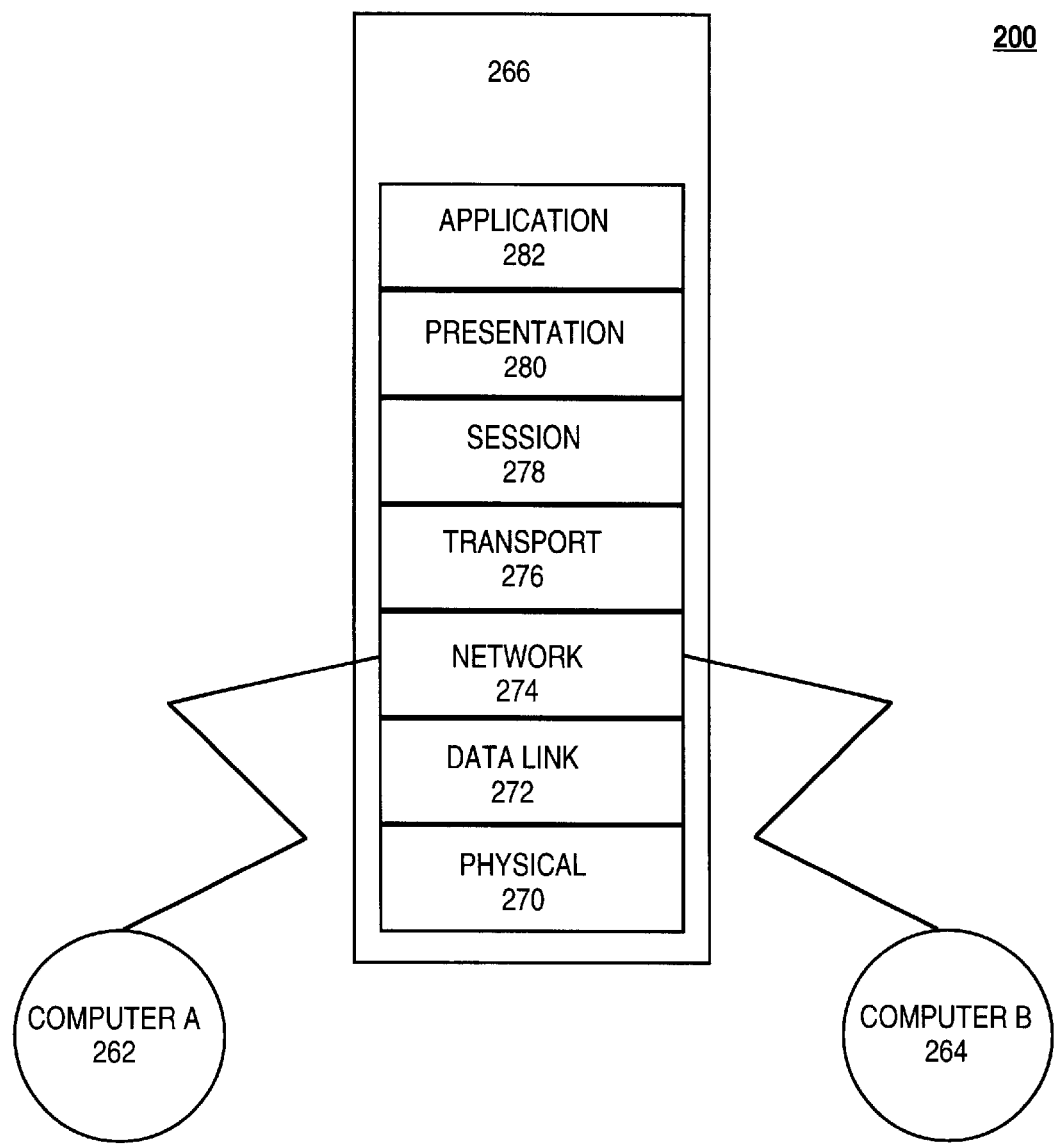
FIG. 2 illustrates a conventional Open System Interconnection (OSI) system where typical network communication activities are divided into seven layers.
Figure 3:
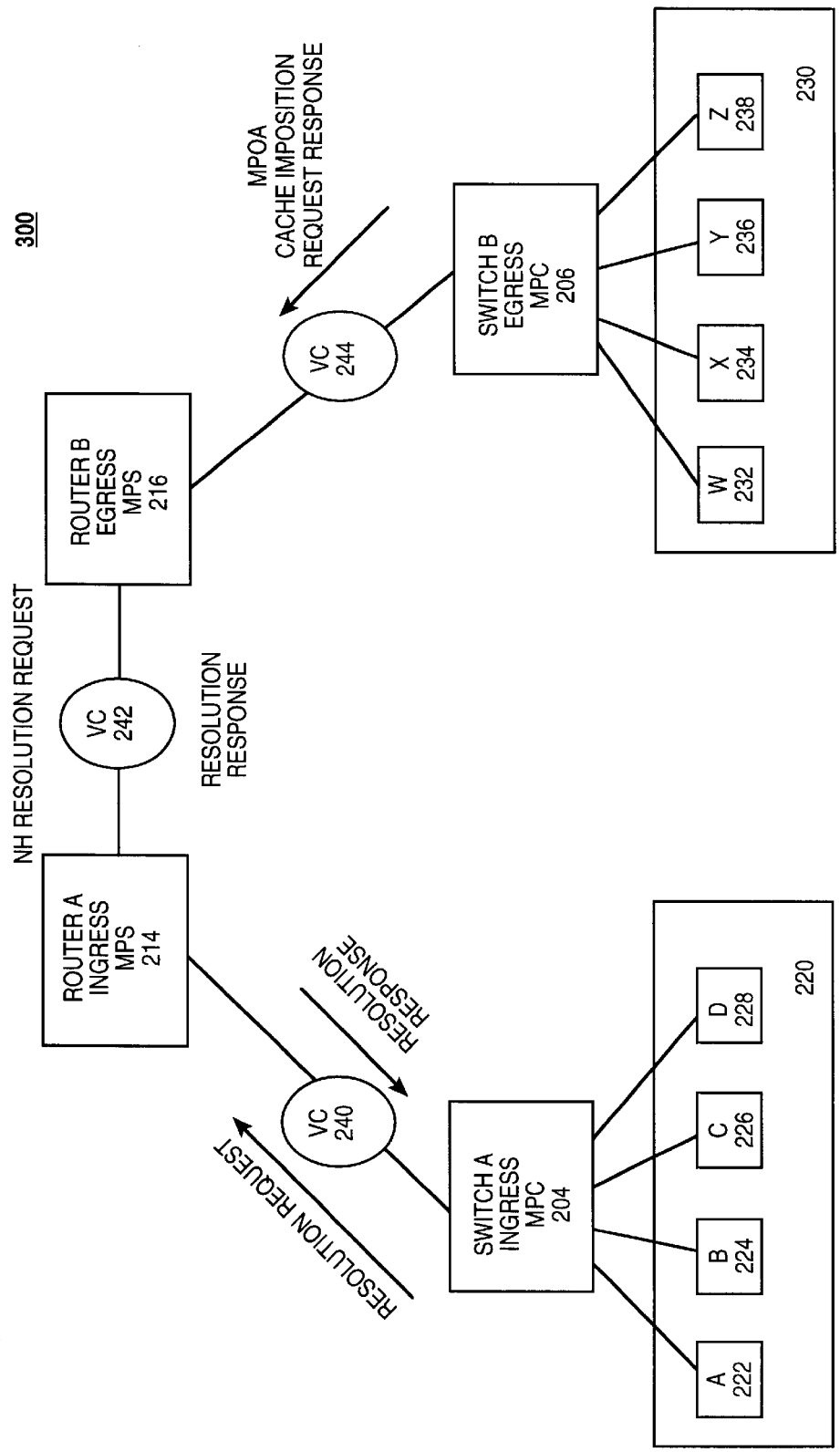
FIG. 3 illustrates a commonly employed approach for setting up a connection between two switches.
Figure 4:
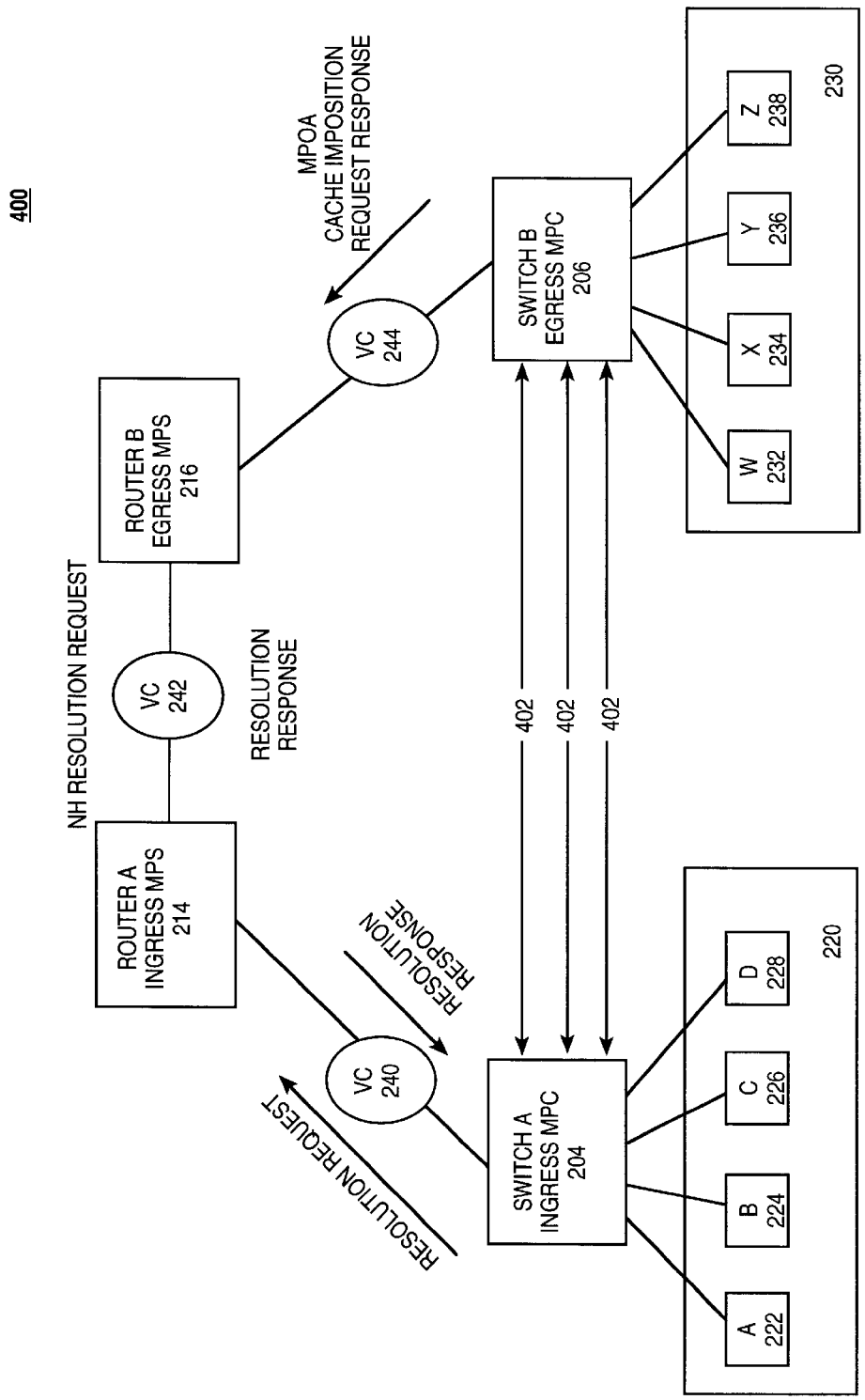
FIG. 4 illustrates a Switch Connecting Scheme (SCS) for establishing multiple switch to switch connections for all levels of QoS in accordance with an embodiment of the present invention.

FIG. 4 illustrates an embodiment of the SCS 400 for establishing multiple switch to switch connections. The SCS 400 contains switch A 204, router A 214, router B 216, switch B 206, and switch to switch connections 402.

Switch A 204 further contains workstation A 222, B 224, C 226, and D 228, and switch B 206 contains workstation W 232, X 234, Y 236, and Z 238. A workstation is commonly referred as a computer that is connected to a network. Virtual Channel Connections or Virtual Circuit Connections (VCC) are employed for connections between switches to routers, switches to switches, routers to routers, and routers to switches.

The SCS 400 is configured to be capable of operating under a network environment. In one embodiment, the SCS 400 is operated under Multi-Protocol over asynchronous transfer mode (MPOA). The asynchronous transfer mode (ATM) is a networking technology that divides a set of information (e.g., a packet) into fixed length cells and is then transported through the network from a source to a destination.

Referring back to FIG. 4, the configuration of the SCS 400 also contains VCCs where each VCC is a point to point intelligent circuit channels (or connections). VCCs have different intelligent levels depending on the location of the connection. For example, different connections, such as router to router, switch to switch, router to switch, switch to switch, and so on, often require different levels of VCC intelligence for better networking performance. In one embodiment, VCCs are used for switch to switch connections.

Each switch includes a storage device, which stores addresses of workstations that are associated (or attached or connected) to the switch. Thus, a switch knows how many workstations that are associated with the switch and knows where to access the workstations. Thus, increasing data transfer between switches enhances the performance of the network.

Even though routers commonly have lower rate of data transfer than switches, routers are capable of locating a destination node in the network.

Under network routing protocols, such as Next Hop Routing Protocols (NHRP), a request for transferring data between a source and destination nodes may hop between routers until the destination is found. It is common to have multiple hops through network routers before the request reaches the destination node.

The SCS 400 further includes functions of detecting a communication flow, issuing a resolution request, receiving a response to the resolution request, identifying levels of QoS and establishing switch to switch connections. A communication flow indicates a source and destination addresses where the addresses may be Internet Protocol (IP) addresses. A communication flow is detected when a detecting mechanism is triggered by a flow criteria. In one embodiment, a flow criteria is a set of predefined conditions.

Upon detection of a communication flow, a switch associated with the source, which is also called ingress multi-protocols client (MPC), issues a resolution request if the destination is not associated with the switch. Egress is a device that provides information while ingress is a device that requests information. In FIG. 4, switch A 204 is an ingress MPC and it first searches its database to see whether switch A 204 contains the destination node. If switch A 204 contains the address of the destination, which indicates that both source and destination nodes are connected to switch A 204, the destination node is found. Since both the source and the destination are connected to the same switch, no switch to switch connection is established.

If the destination node is not attached to switch A 204, switch A 204 issues a resolution request to router A 214, which is also called ingress multi-protocol server (MPS), for locating the destination node. Router A 214 determines whether router A 214 contains the requested information. If router A 214 does not contain the requested information, it will a use network routing protocol, such as NHRP, to identify another router, such as router B 216, that may contain the requested information.

After receipt of the resolution request, router B 216 identifies switch B 206 that contains the requested information. Upon identifying the address of the destination, switch B 206 sends a response to the source node in response to the resolution request. In one embodiment, switch B 206, also known as Egress MPC, includes a MPOA cache imposition in the response. A cache imposition includes information and the address of the destination node. In another embodiment, the cache imposition contains a tag, or a pointer that indicates a storage location where the requested information can be found.

The cache imposition can be either configured in a hardware storage device or a software data structure.

The response with the cache imposition is transported from switch B 206 to switch A 204 where the source node can be located. In one embodiment, the response takes the existing VCCs, such as VCC 244, VCC 242, and VCC 240 in FIG. 4, to reach the source node. Upon receipt of the response from the egress MPC 206, the SCS 400 then identifies total levels of QoS. The levels of QoS can be predefined or can be combination of input values. Upon identifying all levels of QoS, switch to switch connections between switch A 204 and switch B 206 are established where each switch to switch connection is designated to a level of QoS. In other words, if QoS has four levels, four switch to switch connections are established. Once the switch to switch connections are established, workstations and devices, such as servers and printers, associated with the connected switches can also use the connections.

Setting up multiple switch to switch connections in response to levels of QoS sometimes incurs waste of resources when some levels of QoS are not in use. The SCS 400 employs a torn-down mechanism to alleviate this waste by tearing down non-use switch to switch connections. The torn-down mechanism operates according to a torn-down criteria, where the criteria may include a set of different sub-criteria or a logical combination of a predefined criteria. In one embodiment, the SCS 400 uses a timer as the torn-down criteria where a switch to switch connection is torn down if it has not been used within a predefined time interval.

For example, workstation A 222 in FIG. 4 issues a request to switch A 204 for accessing a database located in workstation Z 238. Switch A 204 first searches its own database to see whether workstation Z 238 is in the database.

If switch A 204 does not contain the requested information regarding workstation Z 238, switch A 204 issues a resolution request to router A 214 for locating workstation Z 238. A VCC 240 is, subsequently, established between switch A 204 and router A 214 for transferring information. If router A 214 does not contain the requested information, router A 214 uses NHRP to locate router B 216, which may contain the requested information. After establishing VCC 242 between router A 214 and router B 216, the resolution request is passed from router A 214 to router B216. Router B 216 subsequently identifies switch B 206, which may contain the requested information. After establishing a VCC 244 between router B 216 and switch B 206, the resolution request is transported to switch B 206. Upon receipt of the resolution request, switch B 206 sends a response including the cache imposition to workstation A 222. After receipt of the response, multiple switch to switch connections 402 between switch A 204 and switch B 206 are established in response to the levels of QoS. Once the switch to switch connections are established, workstation A 222, B 224, C 226, D 228, W 232, X 234, Y 236, and Z 238 can also use the connections 402.

Figure 5:
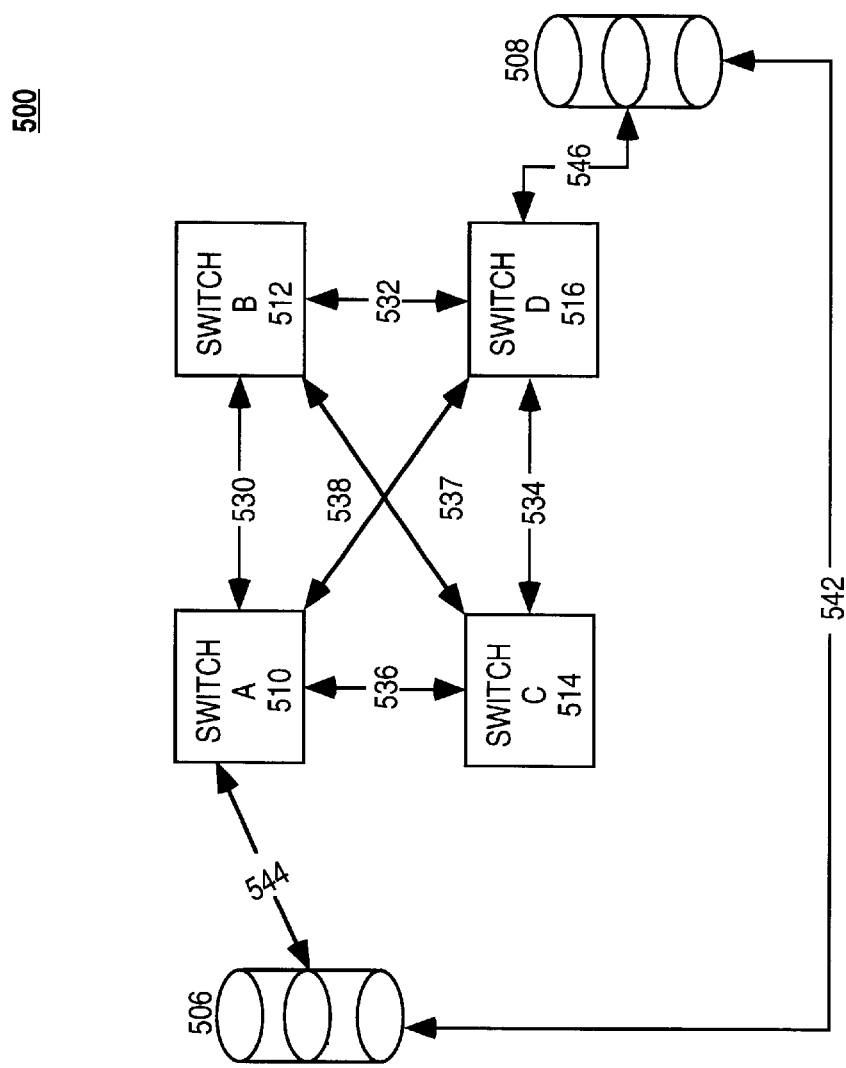
FIG. 5 illustrates a configuration of interconnections between switches and routers in accordance with an embodiment of the present invention.

FIG. 5 illustrates an embodiment of switch matrix 500 used for the SCS 400. The switch matrix 500 contains multiple interconnected switches and is commonly used to perform bridging function in a network. The switch matrix 500 contains switch A 510, B 512, C 514, and D 516. Switch A 510 is configured to connect to a router 506, switch B 512, C 514, and D 516 via connection lines 544, 530, 536, and 538, respectively. Also, Switch B 512 is connected to switch C 514 and D 516 via connection lines 537 and 533, respectively. Moreover, Switch D 516 connects to a router 508 and switch C 514 via connection lines 546 and 534, respectively. It should be noted that more routers may be situated between router 506 and 508.

Even though switches within the switch matrix 500 are physically interconnected, there are no logical links between the switches. In other words, each switch in the matrix 500 does not know its neighboring switches and consequently, does not know what workstations are connected to its neighbors. In one embodiment, the SCS 400 provides logical links to the switches in the matrix 500. Accordingly, physical interconnections in the matrix 500 can be used as switch to switch connections when the logic links 25 are provided.

Figure 6:
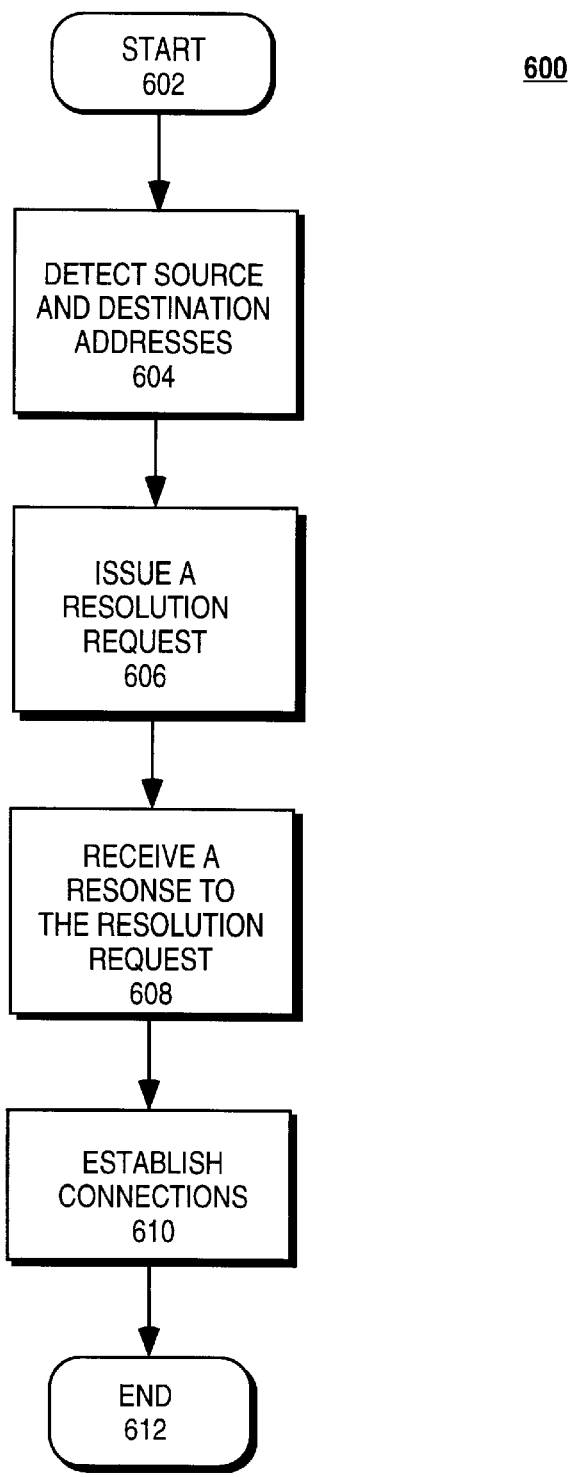
FIG. 6 illustrates a block diagram of the SCS for establishing multiple switch to switch connections in response to all levels of QoS in accordance with an embodiment of the present invention.

FIG. 6 illustrates a block diagram of the SCS 600 where the process begins at block 602. The process moves from block 602 to block 604, where block 604 detects a communication flow between a source and destination nodes according to a flow criteria. In one embodiment, a communication flow is an IP address, where the IP address contains source and a destination addresses. Upon discovering a communication flow, the process moves from block 604 to 606 where the process issues a resolution request for locating the destination. After issuance of the resolution request, the process moves from block 606 to block 608.

At block 608, the process receives a response to the resolution request. In one embodiment, the response includes a cache imposition, which indicates where the destination can be found. The cache imposition is configured in a hardware configuration. In another embodiment, the cache imposition is configured in a software data structure. Upon receipt of the response, the process moves from block 608 to block 610 where the process identifies all levels of QoS. The QoS level can be determined by a predefined value or a logical combination of input values. After identifying levels of QoS, the process establishes multiple switch to switch connections where each individual connection is configured to be used only for a particular level of QoS.

At block 610, the process tears down unnecessary switch to switch connections according to a torn-down criteria. The torn-down criteria may be a predefined criteria or a set of criteria. In one embodiment, a time interval is used for a torn-down criteria where a switch to switch connection is torn down if the connection has not been used for a predefined time period. It should be noted that after the switch to switch connections are set up, every workstation or device associated with the connected switches can also use the connections. The process then moves from block 610 to block 612 where the process stops.

Figure 7:
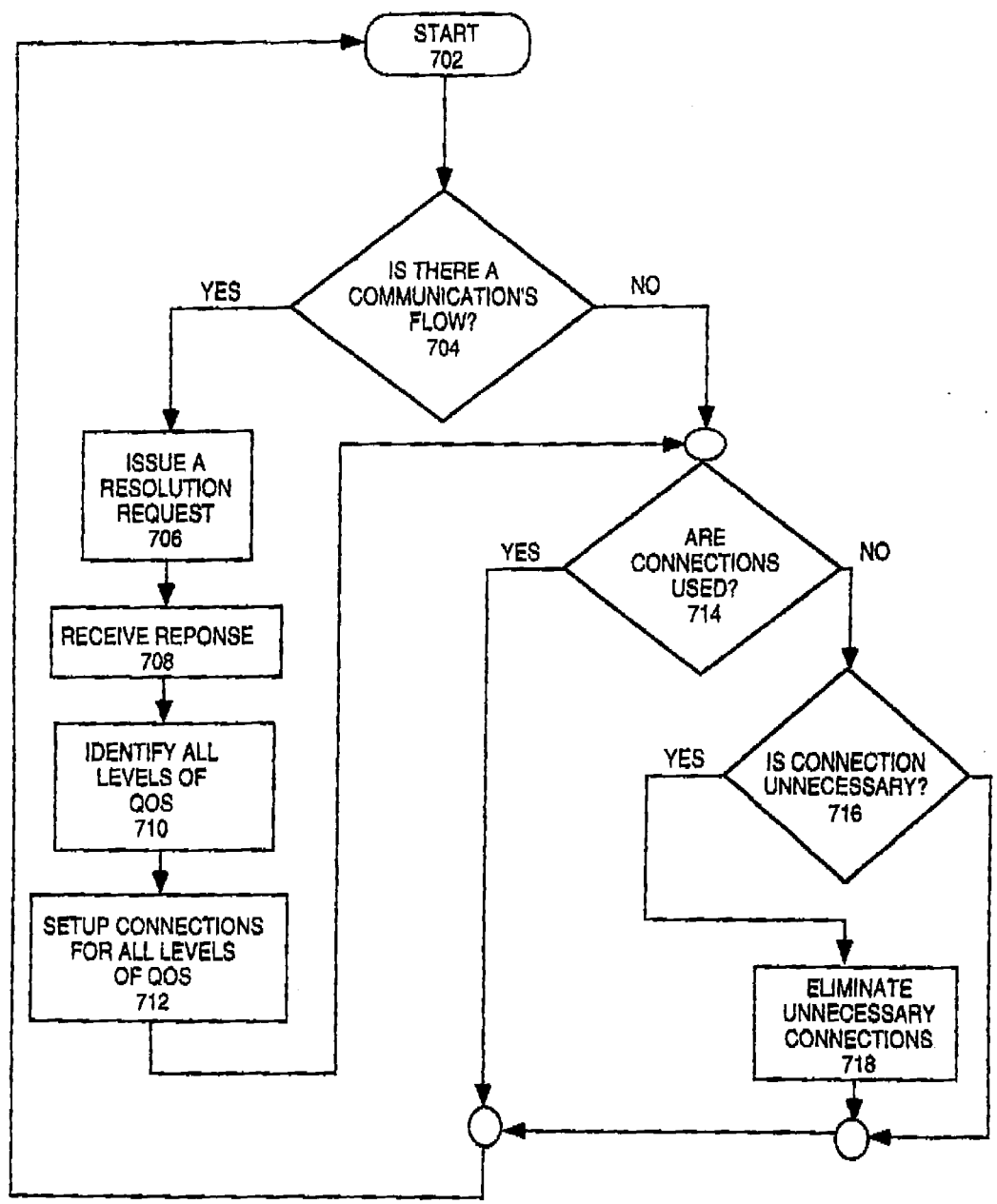
FIG. 7 is a flow chart illustrating a process of the SCS for establishing multiple switch to switch connections in accordance with an embodiment of the present invention.

FIG. 7 is a flow chart illustrating an embodiment of the SCS 700 for establishing switch to switch connections. The process begins at block 702 and proceeds to block 704. At block 704, the process examines whether there is a communication flow between a source and destination nodes. If there is a communication flow, the process proceeds from block 704 to block 706 where the process issues a resolution request.

A resolution request inquires network routers to find the address of the destination node. The SCS 700 employs network routing protocols that allows multiple hops between network routers before locating the destination. In one embodiment, the network routing protocol is NHRP. Upon discovery of the destination node, the egress MPC sends a response to the resolution request. The response includes a cache imposition, which indicates the address of the destination.

After block 706, the process proceeds to block 708 where the ingress MPC receives a response to the resolution request. In one embodiment, the response contains a cache imposition, which is a cache tag that points to a location where the information regarding to the destination node can be found. Upon receipt of the response, the process proceeds from block 708 to block 710.

At block 710, the SCS 700 identifies all levels of QoS where levels of QoS may be predefined. It should be noted that different levels of QoS requires different bandwidths for transferring information over the network. After block 710, the process moves to block 712 where the process sets up switch to switch connections in response to the levels of QoS. Each individual switch to switch connection is configured to be used for a level of QoS. Consequently, the additional time is not needed to setup switch to switch connections for different QoS levels because the switch to switch connections associated to all levels of QoS are setup at the same time. In one embodiment, upon establishing the connections between switches, workstations and devices associated with the switches may be allowed to use the connections for data transfer.

After block 712, the process proceeds to block 714. Moreover, if there is no communication flow between a source and destination node at block 704, the process moves to block 714. At block 714, the process identifies unnecessary switch to switch connections by examining whether all of the switch to switch connections have been used. If block 714 is true, which indicates that all the switch to switch connections have been used, the process loops back to block 702 to start a new process.

If block 714 is false, which indicates that there is at least one switch to switch connection that has not been used, the process moves to block 716 where the process applies the torn-down criteria. If block 716 is true, which indicates that at least one switch to switch connection is unnecessary in response to at least one of the torn-down criteria, the process proceeds to block 718. At block 718, the unnecessary switch to switch connection is eliminated or torn down.

After block 718, the process loops back to block 702 to start a new process. Likewise, if block 716 was false, which indicates that the switch to switch connection currently not in use is necessary according to the torn-down criteria, the process proceeds to block 702 where a new process starts.

Thus, what has been disclosed a method and a system for improving data communication in a network using a switch connecting scheme.

What is claimed is:

1. A method for improving data communication in a network comprising:
   detecting a communication flow from a source node to a destination node;
   issuing a resolution request in response to said communication flow;
   receiving a response to said resolution request that identifies a data path from said source node to said destination node; and
   simultaneously establishing multiple connections in response to said response to said resolution request, each of said multiple connections using said data path, each of said multiple connections providing a level QoS, wherein said multiple connections provide all levels of quality of service ("QoS") for said destination node.

2. The method of claim 1 further comprising: setting up said multiple connections between switches.

3. The method of claim 2 further comprising: allowing other client nodes associated to said switches to use said multiple connections.

4. The method of claim 1 further comprising: eliminating unnecessary said connections in response to a torn-down criteria.

5. The method of claim 1, wherein detecting a communication flow further comprises identifying Internet Protocol ("IP") addresses within said communication flow.

6. The method of claim 1, wherein establishing multiple connections further comprises setting up virtual circuit connections ("VCCs") for said multiple connections.

7. The method of claim 1, wherein establishing said multiple connections further comprises assigning each individual connection for one said level of QoS.

8. The method of claim 1, wherein establishing multiple connections further comprises identifying said levels of QoS.

9. The method of claim 1, wherein establishing multiple connections further comprises Identifying switches associated with said source and destination nodes.

10. An apparatus for improving data communication in a network comprising:
   a detection circuit to detect a communication flow from a source node to a destination node;
   a circuit to issue a resolution request in response to said communication flow;
   a receiving circuit to receive a response to said resolution request that identifies a data path from said source node to said destination node; and
   a circuit to simultaneously establish multiple connections in response to said response to said resolution request, each of said multiple connections using said data path, each of said multiple connections providing all level of QoS, wherein said multiple connections provide all levels of quality of service ("QoS") for said destination node.

11. The apparatus of claim 10 further comprising a circuit to set up said multiple connections between switches.

12. The apparatus of claim 10 further comprising a circuit to allow other client nodes associated to said switches to use said multiple connections.

13. The apparatus of claim 10 further comprising a circuit to eliminate unnecessary connections in response to a torn-down criteria.

14. The apparatus of claim 10, wherein the detection circuit further comprises a circuit to identify Internet Protocol ("IP") addresses within said communication flow.

15. The apparatus of claim 10, wherein said circuit to establish multiple connections further comprises a circuit to set up virtual circuit connections ("VCCs") for said multiple connections.

16. The apparatus of claim 10, wherein said circuit to establish said multiple connections further comprises a circuit to assign each individual connection for one said level of QoS.

17. The apparatus of claim 10, wherein said circuit to establish multiple connections further comprises a circuit to identify said levels of QoS.

18. The apparatus of claim 10, wherein said circuit to establish multiple connections further comprises a circuit to identify switches associated with said source and destination.

19. A network system comprising:
   routers;
   switches coupled to said network routers; and
   a communication interface coupled to said switches, said communication interface configured to simultaneously establish multiple connections to a destination node by issuing a resolution request after detecting a communication flow from a source node to said destination node and receiving a responses in response to said resolution request that identifies a data path from said source node to said destination node, each of said multiple connections using said data path, each of said multiple connections providing a level of QoS, wherein said multiple connections provide all levels of quality of service ("QoS").

20. The network system of claim 19, wherein said communication flow includes Internet Protocol ("IP") addresses.

21. The system of claim 19, wherein said connections are switch to switch virtual circuits connections (VCCs).

22. The system of claim 19, wherein each said connection is configured to assign to one level of QoS.

23. The system of claim 19, wherein said communication interface is further configured to identify levels of QoS.

24. A computer readable program product comprising a computer usable medium for use in a network system for improving network communication, the computer readable program product comprising:
   computer readable program code to detect a communication flow from a source node to a destination node;
   computer readable program code to issue a resolution request in response to said communication flow;
   computer readable program code to receive a response to said resolution request, said response identifying a data path from said source node to said destination node; and
   computer readable program code to simultaneously establish multiple connections in response to said response to said resolution request, each of said multiple connections using said data path, each of said multiple connections providing a level of QoS, wherein said multiple connections provide all levels of quality of service ("QoS") for said destination node.

25. The computer readable program product of claim 24 further comprising computer readable program code to set up said multiple connections between switches.

26. The computer readable program product of claim 24 further comprising computer readable program code to allow other client nodes associated to said switches to use said multiple connections.

27. The computer readable program product of claim 24 further comprising computer readable program code to eliminate unnecessary connections in response to a torn-down criteria.

28. The computer readable program product of claim 24, wherein said computer readable program code to detect a communication flow further comprises computer readable program code to identify Internet Protocol ("IP") addresses within said communication flow.

29. The computer readable program product of claim 24, wherein said computer readable program to establish multiple connections further comprises computer readable program code to set up virtual circuit connections ("VCCs") for said multiple connections.

30. The computer readable program product of claim 24, wherein said computer readable program code to establish said multiple connections further comprises computer readable program code to assign individual connection to a level of said QoS.

31. The computer readable program product of claim 24, wherein said computer readable program code to establish multiple connections further comprises computer readable program code to identify said levels of QoS.

32. The computer readable program product of claim 24, wherein said computer readable program code to establish multiple connections comprises computer readable program code to identify switches associated with said source and destination.

* * * * *